US012640937B2

(12) United States Patent
Pyle

(10) Patent No.: US 12,640,937 B2
(45) Date of Patent: May 26, 2026

(54) DEVICE GENUINENESS CERTIFICATE DEPRECATION WITHOUT CERTIFICATE REVOCATION

(71) Applicant: Schneider Electric USA, Inc., Andover, MA (US)

(72) Inventor: Michael Pyle, Hermitage, TN (US)

(73) Assignee: Schneider Electric USA, Inc., Boston, MA (US)

( * ) Notice: Subject to any disclaimer, the term of this patent is extended or adjusted under 35 U.S.C. 154(b) by 148 days.

(21) Appl. No.: 18/410,538

(22) Filed: Jan. 11, 2024

(65) Prior Publication Data

US 2025/0233759 A1 Jul. 17, 2025

(51) Int. Cl.
H04L 9/32 (2006.01)
H04L 9/08 (2006.01)

(52) U.S. Cl.
CPC .......... H04L 9/3268 (2013.01); H04L 9/0825 (2013.01); H04L 9/3247 (2013.01)

(58) Field of Classification Search
None
See application file for complete search history.

(56) References Cited

U.S. PATENT DOCUMENTS

2008/0243811 A1* 10/2008 He ........................ G06F 16/322
707/999.005
2013/0346747 A1 12/2013 Ignatchenko et al.

2016/0191253 A1* 6/2016 Pyle ................... H04L 63/0823
380/28
2020/0412548 A1* 12/2020 Allen ...................... G06F 8/658
2022/0405392 A1 12/2022 Nix

OTHER PUBLICATIONS

International Search Report and Written Opinion dated Mar. 25, 2025 for corresponding International Patent Application No. PCT/US2025/011155, 15 pages.

* cited by examiner

*Primary Examiner* — Jeffrey C Pwu
*Assistant Examiner* — Mayasa A. Shaawat
(74) *Attorney, Agent, or Firm* — Wolf, Greenfield & Sacks, P.C.

(57) ABSTRACT

Embodiments described herein provide techniques for securely validating firmware on a device using certificates and providing a mechanism for deprecating select certificates when a traditional certificate authority is unavailable or otherwise cannot be used. When a first firmware package is installed on the device, a first certificate in a first secure memory location is associated with an active status. Responsive to validation and installation of a second firmware package on the device, a second certificate in a second secure memory location on the device is associated with an active status. During a boot-up operation on the device, embodiments determine to use the second certificate to validate the second firmware package by starting at a predefined secure memory location and scanning backwards until a status of active is identified. The second firmware package on the device is then validated using the second certificate.

18 Claims, 8 Drawing Sheets

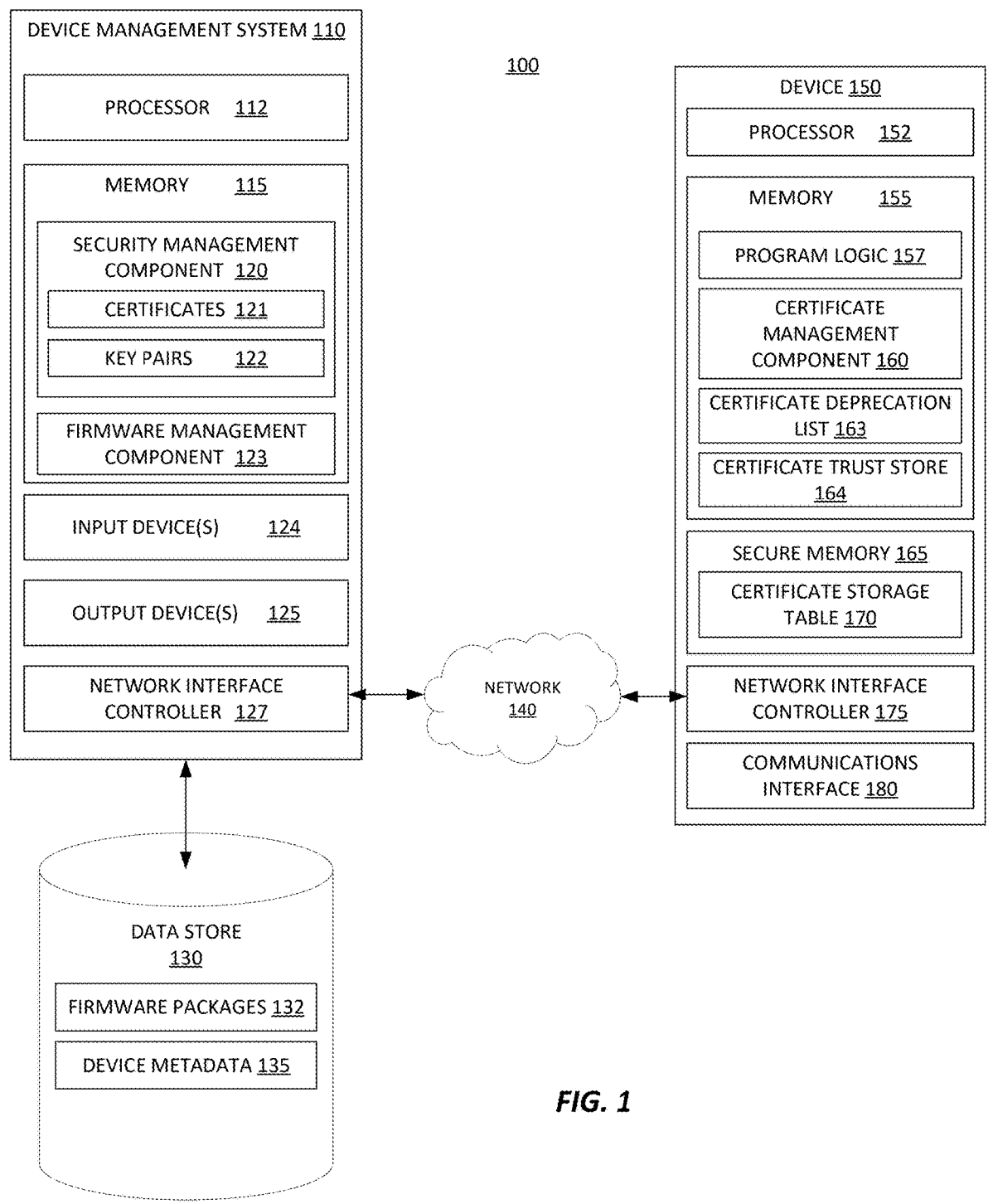

DEVICE MANAGEMENT SYSTEM 110

PROCESSOR 112

MEMORY 115

SECURITY MANAGEMENT COMPONENT 120

CERTIFICATES 121

KEY PAIRS 122

FIRMWARE MANAGEMENT COMPONENT 123

INPUT DEVICE(S) 124

OUTPUT DEVICE(S) 125

NETWORK INTERFACE CONTROLLER 127

100

NETWORK 140

DEVICE 150

PROCESSOR 152

MEMORY 155

PROGRAM LOGIC 157

CERTIFICATE MANAGEMENT COMPONENT 160

CERTIFICATE DEPRECATION LIST 163

CERTIFICATE TRUST STORE 164

SECURE MEMORY 165

CERTIFICATE STORAGE TABLE 170

NETWORK INTERFACE CONTROLLER 175

COMMUNICATIONS INTERFACE 180

DATA STORE 130

FIRMWARE PACKAGES 132

DEVICE METADATA 135

| Memory Location | Certificate Slot | Certificate ID (0<=ID<15) | Certificate Status |
|---|---|---|---|
| 0 | DG Certificate 0 signed by Intermediate Certificate A | 0 | <A>CTIVE |
| 1 | DG Certificate 1 signed by Intermediate Certificate B | 1 | <I>NACTIVE |
| 2 . . . | DG Certificate 2 signed by Intermediate Certificate C | 2 | <I>NACTIVE |
| . . . n | DG Certificate n signed by Intermediate Certificate n | n | <I>NACTIVE |

| Memory Location | Certificate Slot | Certificate ID (0<=ID<15) | Certificate Status |
|---|---|---|---|
| 1 | DG Certificate 0 signed by Intermediate Certificate 1 | 0 | <D>EPRECATED |
| 2 | DG Certificate 1 signed by Intermediate Certificate 2 | 1 | <A>CTIVE |
| 3 . . . | DG Certificate 2 signed by Intermediate Certificate 3 | 2 | <I>NACTIVE |
| . . . n | DG Certificate n signed by Intermediate Certificate n | 3 | <I>NACTIVE |

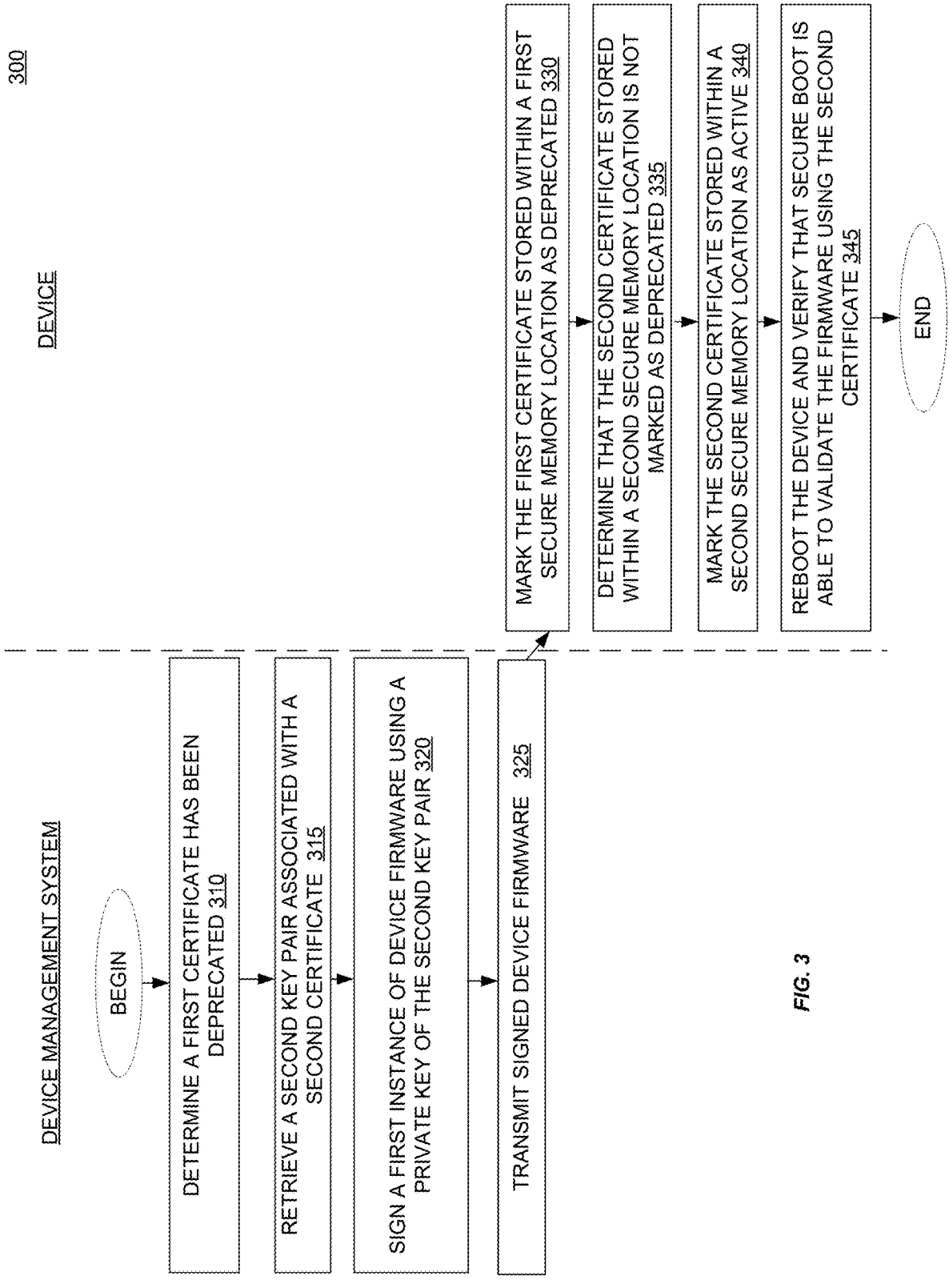

DEVICE MANAGEMENT SYSTEM

BEGIN

DETERMINE A FIRST CERTIFICATE HAS BEEN DEPRECATED 310

RETRIEVE A SECOND KEY PAIR ASSOCIATED WITH A SECOND CERTIFICATE 315

SIGN A FIRST INSTANCE OF DEVICE FIRMWARE USING A PRIVATE KEY OF THE SECOND KEY PAIR 320

TRANSMIT SIGNED DEVICE FIRMWARE 325

DEVICE

300

MARK THE FIRST CERTIFICATE STORED WITHIN A FIRST SECURE MEMORY LOCATION AS DEPRECATED 330

DETERMINE THAT THE SECOND CERTIFICATE STORED WITHIN A SECOND SECURE MEMORY LOCATION IS NOT MARKED AS DEPRECATED 335

MARK THE SECOND CERTIFICATE STORED WITHIN A SECOND SECURE MEMORY LOCATION AS ACTIVE 340

REBOOT THE DEVICE AND VERIFY THAT SECURE BOOT IS ABLE TO VALIDATE THE FIRMWARE USING THE SECOND CERTIFICATE 345

END

```
<?xml version="1.0" encoding="UTF-8"?>    410
<deprecation>
    <version>x,y</version>    420
    <family>simple product family designation</family>    430
    <deprecate>certificate id to deprecate</deprecate>    440
</deprecation>
```

```
<?xml version="1.0" encoding="UTF-8"?>
<deprecation>
  <version>1.0</version>
  <family>PM55xx</family>
  <deprecate>1</deprecate>
</deprecation>
```

BEGIN

WHEN A FIRST FIRMWARE PACKAGE IS INSTALLED ON THE SYSTEM, ASSOCIATING A FIRST CERTIFICATE IN A FIRST SECURE MEMORY LOCATION WITH AN ACTIVE STATUS, WHEREIN THE ACTIVE STATUS INDICATES THAT THE FIRST CERTIFICATE WILL BE USED DURING BOOT OPERATIONS TO VALIDATE A SIGNATURE OF THE FIRST FIRMWARE PACKAGE ON THE SYSTEM, AND WHEREIN THE FIRST CERTIFICATE IS DIGITALLY SIGNED WITH A FIRST SIGNATURE <u>610</u>

RESPONSIVE TO INSTALLATION OF A SECOND FIRMWARE PACKAGE ON THE SYSTEM, ASSOCIATING A SECOND CERTIFICATE IN A SECOND SECURE MEMORY LOCATION ON THE SYSTEM WITH AN ACTIVE STATUS, WHEREIN THE SECOND SECURE MEMORY LOCATION IS IMMEDIATELY ADJACENT TO THE FIRST SECURE MEMORY LOCATION, AND WHEREIN THE SECOND CERTIFICATE IS DIGITALLY SIGNED WITH A SECOND SIGNATURE <u>615</u>

DURING A BOOT-UP OPERATION ON THE SYSTEM, DETERMINING TO USE THE SECOND CERTIFICATE TO VALIDATE THE SECOND SIGNATURE OF THE SECOND FIRMWARE PACKAGE BY STARTING AT A PREDEFINED SECURE MEMORY LOCATION AND SCANNING BACKWARDS UNTIL A STATUS OF ACTIVE CORRESPONDING TO THE SECOND CERTIFICATE IS IDENTIFIED <u>620</u>

UPON VALIDATING THE SIGNATURE OF THE SECOND FIRMWARE PACKAGE ON THE SYSTEM USING THE SECOND PUBLIC KEY, FULLY BOOTING THE SYSTEM USING THE SECOND FIRMWARE PACKAGE <u>625</u>

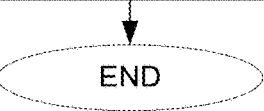

END

*FIG. 6*

DEVICE GENUINENESS CERTIFICATE DEPRECATION WITHOUT CERTIFICATE REVOCATION

TECHNICAL FIELD

The present disclosure relates to device security, and more particularly, to techniques for managing certificates used in the operation of secured firmware for devices.

BACKGROUND

Connected devices of a variety of types are becoming increasingly common in modern homes, factories and many other environments. While networks of connected devices offer many benefits and improvements over conventional environments, such environments present new network security challenges. One challenge that such devices face is what to do if the security of a device is ever compromised and how security credentials can be deprecated over time and new security credentials can be securely replaced in the device as needed. A particular technical challenge exists for managing the security of devices that may lack the computing resources needed to implement more involved solutions, as is the case with many Internet of Things (IoT) devices and various legacy devices that may lack the computing power and memory resources to execute modern certificate revocation techniques. Moreover, in some instances, these devices are placed on isolated data communications networks without access to the Internet and therefore may be unable to carry out modern certificate revocation techniques.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

FIG. 1 is a block diagram illustrating a system configured with a certificate management component, according to one embodiment described herein.

FIGS. 2A-B are block diagrams illustrating secured memory certificate stores, according to one embodiment described herein.

FIG. 3 is a flow chart illustrating a method for deprecating a compromised certificate used in a secure boot operation for a device, according to embodiments described herein.

FIGS. 4A-B are block diagrams illustrating secured memory certificate stores, according to one embodiment described herein.

FIG. 6 is a flow chart illustrating a method for validating firmware using an updated certificate, according to one embodiment described herein.

DETAILED DESCRIPTION

Figure 4B:
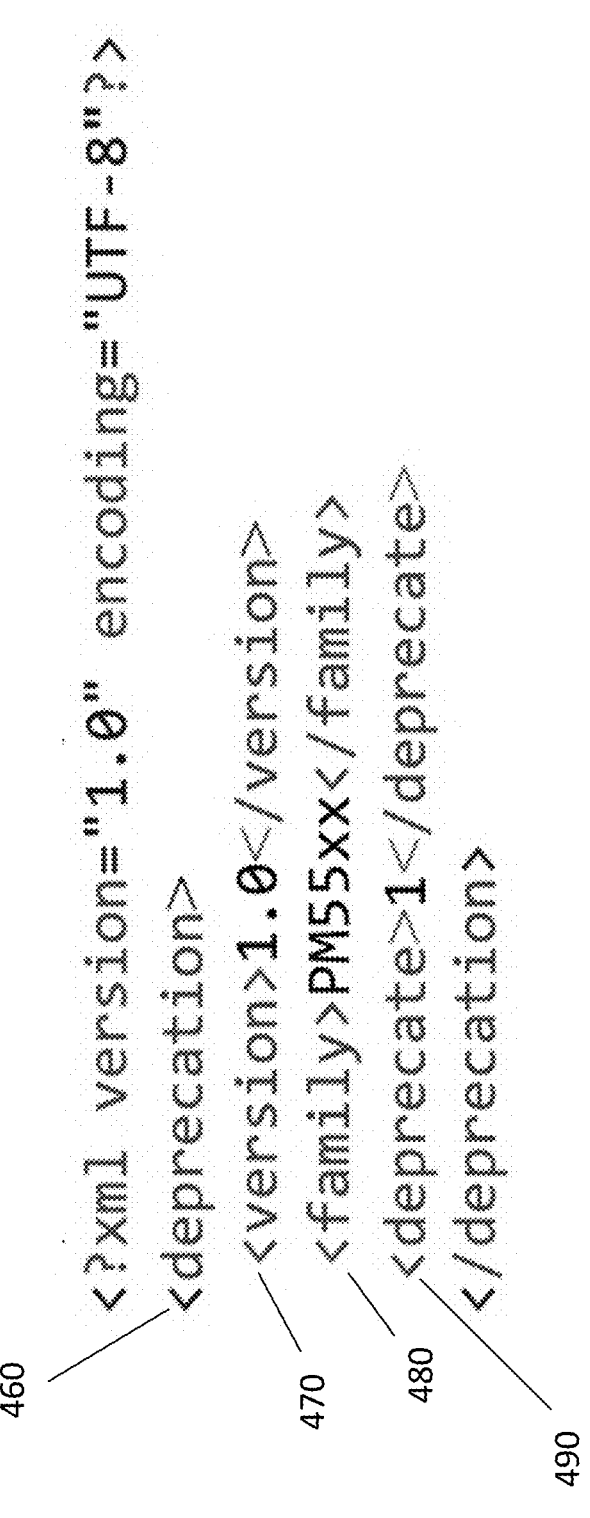

FIG. 1 is a block diagram illustrating a system configured with a security management component, according to one embodiment described herein. As shown, the system 100 includes a device management system 110 and a device 150, interconnected via a network 140. The device management system 110 includes a processor 112, a memory, one or more input devices 123, one or more output devices 125 and a network interface controller 127. The memory 115 includes a security management component 120 and a firmware management component 122.

Generally, the security management component 120 is configured to sign firmware packages 132 managed by the firmware management component 122 using an active certificate in the previously generated certificates 121. The security management component 120 can then transmit the signed firmware packages 132 to the device 150 to be installed and executed on the device 150. In some instances, the security management component 120 may determine that a particular certificate has been deprecated (e.g., if the underlying key pair in the key pairs 122 has been compromised) or, for other reasons, it is desirable to transition from using the active certificate to a new certificate (e.g., the active certificate could be updated periodically as a precautionary measure).

The device 150 includes a processor 152, a memory 155, a secure memory 165, a network interface controller 175 and a communications interface 180. The memory 155 contains program logic 157, a certificate management component 160, a certificate deprecation list 163 and a certificate trust store 164. The secure memory 165 contains a certificate storage table 170. Generally, the program logic 157 represents any application-specific program logic that resides on the device 150 and generally relates to the overall purpose of the device 150. For example, a particular automation device 150 within an industrial automation environment may have program logic 157 that relates to the function of the automation device within the industrial automation system. As another example, an energy management device 150 within a residential environment may be configured with program logic 157 configured to report on energy management metrics, to send notifications when a circuit breaker within the device 150 has tripped, or more generally any other functions that may be appropriate in a residential energy management context. Of course, such examples are for illustrative purposes only, and more generally any program logic 157 can be used for any of a variety of different environments and contexts, consistent with the functionality described herein.

Additionally, the device management system 110 is communicatively coupled to a data store 130. In the depicted embodiment, the data store 130 includes firmware packages 132 and device metadata 135. Generally, the firmware packages 132 contain various versions of firmware packages configured to be installed on the device 150. The device metadata 135 generally contains data describing the device 150 and attributes thereof. Examples of such device metadata 135 can include, without limitation, a device identifier corresponding to the device 150, a network address corresponding to the device 150, a model number of the device 150, a device type of the device 150, a manufacture date of the device 150, a current version of firmware installed on the device 150, and so on.

In one embodiment, the security management component 120 can sign a first firmware package using a first certificate from the certificates 121. Generally, the key pairs 122 refer to pairs of mathematically related keys that can be used to encrypt data, such as a public key and a private key. As an example, the key pairs 122 can be generated according to a Rivest-Shamir-Adleman (RSA) cryptosystem, such that the private key can be used to encrypt data and the corresponding public key can be used for decrypting the data. Additionally, such keys can be used to generate the certificates 121, and the certificates can be used to sign data (e.g., firmware packages 132). For example, the firmware signer could submit a certificate request containing a first public key from a first key pair of the key pairs 122 to a certificate authority, and the certificate authority could generate and return a certificate in response. This certificate could be provided to the device 150 and stored in the certificate storage table 170 of the secure memory 165. In one embodiment, multiple certificates 121 are generated by a manufacturer of the device 150 and are stored in the certificate storage table 170 while the device 150 is still in the manufacturer's control (e.g., prior to the public release/sale of the device 150).

The security management component 120 could generate a hash digest of the firmware data (e.g., using a suitable hashing algorithm) and the security management component 120 could use a first private key from the first key pair to encrypt the hash digest of the data, thereby producing a signature for the firmware data. The security management component 120 could then transmit or otherwise provide the firmware package to the device 150 along with the signature.

Upon receiving the firmware package, the device 150 could install and firmware package and the certificate management component 160 on the device 150 could identify a currently active certificate from the certificate storage table 170. The certificate management component 160 could then attempt to verify the firmware package using the currently active certificate. In doing so, the certificate management component 160 could verify that the signer of the currently active certificate is included within the certificate trust store 164 on the device. The certificate management component 160 could further confirm that the currently active certificate is not specified within the certificate deprecation list 163.

The certificate management component 160 could then generate hash digest by hashing the firmware package (e.g., using the same hashing algorithm as used by the security management component 120). The certificate management component 160 could decrypt the received signature using the currently active certificate and could compare the decrypted hash value with the hash value generated by the certificate management component 160. If the certificate management component 160 determines that the hash values match, the certificate management component 160 could determine that the integrity of the first firmware package has not been compromised (i.e., that the identity of the sender of the first firmware package is confirmed and that the contents of the first firmware package have not changed during transit) and could allow a boot operation of the device 150 using the firmware package to complete.

The secure memory 165 contains a certificate storage table 170. The certificate management component 160 is generally configured to use the certificate storage table 170 to store certificate used in communications with the device management system 110 (e.g., verifying data, such as firmware packages, received from the device management system 110) and to designate which certificate is active at a current moment in time. In one embodiment, multiple certificates are written to the certificate storage table 170 at a particular moment in time (e.g., during an initial configuration of the device 150 by the manufacturer of the device 150 and while the device 150 is still within the manufacturer's control). In such an embodiment, the certificate management component 160 could be restricted from or otherwise unable to write to the certificates within the certificate storage table 170 (e.g., the certificates are stored in a read-only state) but could instead write to a status field(s) associated with each of the various keys. For instance, as will be discussed in more detail below, the certificate management component 160 could write to a status field for a particular certificate, indicating that the certificate is the currently active certificate.

In one embodiment, the certificates within the certificate storage table 170 are written in a contiguous fashion, e.g., within a series of sequential memory addresses. However, it is contemplated that multiple memory locations within the secure memory 165 could be used to store the certificate storage table 170. In such an embodiment, the certificate management component 160 could be configured to map sequential certificate indices (e.g., from 0 to n, where n+1 is the total number of certificates) to memory addresses in the multiple memory locations. As such, while examples provided herein may refer to sequential positions within the certificate storage table 170, it is contemplated that such positions may be within a single physical memory device or could span multiple memory devices.

In a particular embodiment, when a first firmware package is installed on the device 150, the certificate management component 160 associates a first certificate in a first secure memory location in the certificate storage table 170 with an active status. Generally, the active status indicates that the certificate will be used during boot operations to validate a signature of the first firmware package on the first device. In one embodiment, if a firmware package fails validation using the currently active certificate in the certificate storage table 170, the certificate management component 160 could select another certificate(s) and attempt to validate the data using the other certificate(s). For example, the certificate management component 160 could determine that a second certificate at a position k+1 within the certificate storage table 170 is the currently active certificate, where k refers to the position of the previous certificate used by the certificate management component 160. In one embodiment, if the certificate management component 160 is able to validate the firmware package using a particular certificate in the certificate storage table 170, the certificate management component 160 can mark the particular certificate as the currently active certificate (e.g., by writing to a status value corresponding to the particular certificate in the certificate storage table 170). In one embodiment, the certificate management component 160 is configured to unlock the status value corresponding to the first public certificate to modifying the variable, and is further configured to lock the status value subsequent to modifying the variable.

The certificate management component 160 could then use the active certificate during secure boot operations to verify and validate the program logic 157 (e.g., firmware). For example, the certificate management component 160 could hash the program logic 157 or data associated with the program logic 157 to generate a hash digest value. Additionally, the certificate management component 160 could use the active certificate to decrypt a signature received from the device management system 110 together with the firmware value. The certificate management component 160 could then compare the decrypted signature with the generated hash digest value. If the compared values match, the certificate management component 160 could determine that the program logic 157 has integrity (i.e., that the program logic 157 was received from a known party and was not modified during transmission from the known party) and could allow the device 150 to boot up. In the event the certificate management component 160 determines that the hash digest values do not match, the certificate management component 160 could prevent the device 150 from booting into an operational state and could provide feedback (e.g., one or more error messages) indicating that the program logic 157 could not be validated and/or verified.

In one embodiment, if the compared hash digest values do not match, the certificate management component 160 could be configured to iterate to a sequentially next certificate within the certificate storage table 170 (e.g., a second certificate at location k+1, where the first certificate used in the hash digest comparison was stored at location k). The certificate management component 160 could decrypt the signature using the next certificate and could compare the decrypted value with the generated hash digest for the firmware. If the values match, the certificate management component 160 could set the next certificate to the currently active certificate. Additionally, in such an embodiment, the certificate management component 160 could mark the first certificate as deprecated, since the first certificate could not be used to validate the firmware package. As an example, the certificate management component 160 could write an identifier for the first certificate to the certificate deprecation list 163. In the event the comparison using the value decrypted using the second certificate is unsuccessful, the certificate management component 160 could continue to iterate through the certificate storage table 170 until either a matching comparison is found (in which case, the certificate management component 160 could set the certificate used to decrypt the signature in the matching comparison to active) or no certificates remain.

In various instances, the program logic 157 on the device 150 may be updated by the firmware management component 122 of the device management system 110. For example, the program logic 157 could be updated to a newer version. As another example, the security management component 120 could determine that the first certificate is deprecated (e.g., where the integrity of the underlying key pair may have been compromised, periodically over time, etc.). Regardless of the reason, a second firmware package of the firmware packages 132 could be generated and could be signed using a second private key from a second key pair. The firmware management component 122 could then transmit the second firmware package along with a corresponding signature value (e.g., an encrypted hash digest value) to the certificate management component 160 on the device 150.

The device 150 could proceed to install the second firmware package (e.g., based on received user input from a user). During a boot-up operation on the device 150 (e.g., the next boot-up operation following the installation of the second firmware package), the certificate management component 160 could attempt to validate the second firmware package using the currently active certificate. For example, the certificate management component 160 could determine the currently active certificate by starting at a predefined secure memory location and scanning backwards until a status of active is identified. As an example, where the certificate storage table 170 spans indices 0 to n, the certificate management component 160 could begin at position n within the certificate storage table 170 and could scan backwards (i.e., towards index 0) until a certificate having a corresponding active status is identified.

The certificate management component 160 could then validate the second firmware package on the first device using the currently active certificate, and upon successfully validating the second firmware package, the certificate management component 160 could allow the device 150 to continue booting up using the second firmware package.

Doing so enables the device 150 to boot in a secure manner using only verified firmware packages, while allowing for certificates to be revoked without requiring the device 150 to access a Certificate Authority on an external network (e.g., the Internet). That is, because the certificate management component 160 is pre-configured with multiple certificates, the certificate management component 160 can change the active certificate and mark a certificate as deprecated locally and without requiring any communications with a remote Certificate Authority. As such, embodiments described herein can be used to secure firmware packages on devices that may lack the computing resources (e.g., computer processing unit power, device memory, network connectivity, etc.) to interface directly with an external Certificate Authority.

FIGS. 2A-B is a block diagram illustrating a secured memory certificate store, according to one embodiment described herein. The secured memory certificate store 200 illustrates an instance of the certificate storage table 170. As shown, the secured memory certificate store 200 in FIG. 2A contains a device genuineness certificate $220_1$ that has been signed by an intermediate certificate authority A and stored in memory location 1 $210_1$. Generally, the intermediate certificate authorities used to sign the device genuineness certificates $220_{1-n}$ should be identified within the certificate trust store 164 on the device 150, and the certificate management component 160 can validate a given certificate by, in part, confirming that the certificate is signed by a trust authority identified within the certificate trust store 164. In the event the certificate management component 160 determines that a particular device genuineness certificate 220 is signed by a certificate authority that is not identified within the certificate trust store 164, the certificate management component 160 could determine that the particular certificate is invalid. In such an example, the certificate management component 160 could abort any data validation and verification operations using the particular certificate and could take an alternative action (e.g., generating an error notification, iterating to a subsequent certificate within the certificate storage table 170, etc.).

Additionally, the certificate $220_1$ is associated with a status $240_1$ having a value of ACTIVE and a certificate ID $230_1$ of 0. In the depicted embodiment, the certificates $220_{2-n}$ in the locations $210_{2-n}$ are currently in an inactive state and have corresponding status values $240_{2-n}$ of INACTIVE. Similarly, the certificates $220_{2-n}$ in the locations $210_{2-n}$ have corresponding certificate IDs $230_{2-n}$ having values 1-n.

As discussed above, the certificate management component 160 could be configured to use the currently active certificate to verify and validate firmware during secure boot operations. In one embodiment, the certificate management component 160 is configured to identify the currently active certificate by starting at a predefined position (e.g., the last location $210_n$ within the secured memory certificate store 200) within the certificate storage table 170 (i.e., position n in the depicted embodiment) and scanning backwards (i.e., towards the first position within the certificate storage table 170) until a certificate having an active status is identified. The certificate management component 160 then determines that the first certificate identified during the scanning operation having the active status is the currently active certificate. Of note, while the certificate storage table 170 could contain multiple certificates each having an active status, the certificate management component 160 could be configured to designate the first identified certificate in the scanning operation as the currently active certificate.

Returning to the depicted embodiment, the certificate management component 160 could perform the scanning operation and determine that the certificate $220_1$ in the memory location $210_1$ is the currently active certificate on the device. That is, the certificate management component 160 could begin scanning at the memory location n $210n$ and could determine that the first certificate having a corresponding status 240 of ACTIVE is the certificate $220_1$ in memory location $210_1$. The certificate management component 160 could then use the certificate $220_1$ during secure during boot operations to validate a signature of the first firmware package on the device.

In the event particular data (e.g., a particular firmware package or more generally any other data) on the device 150 cannot be verified and validated using the currently active certificate (i.e., the certificate $220_1$ in the memory location $210_1$ in the depicted example), the certificate management component 160 could be configured to iterate to a next certificate within the secured memory certificate store 200 (e.g., if the current certificate is at position k, the certificate management component 160 could iterate to the certificate at position k+1) and could set the next certificate to have a status of ACTIVE. The certificate management component 160 could further set the status of the first certificate to DEPRECATED, indicating that the first certificate should not be used in future verification and validation operations on the device 150.

An example of this is shown in FIG. 2B, where the updated secured memory certificate store 250 illustrates that the certificate management component 160 has modified the certificate status value $280_1$ corresponding to the certificate $220_1$ to contain the value DEPRECATED. Similarly, the certificate management component 160 has modified the certificate status value $280_2$ corresponding to the certificate $220_2$ to contain the value ACTIVE. The certificate management component 160 could then determine the currently active certificate for the device 150 by scanning the secured memory certificate store 250 in reverse order and by determining that the certificate $220_2$ is the first identified certificate to have a certificate status 280 of ACTIVE. However, it should be noted that such an example is provided for illustrative purposes and without limitation, and more generally other techniques for identifying the currently active certificate on the device could be used, consistent with the present disclosure. For example, the certificate management component 160 could be configured to ensure that only a single certificate within the certificate store has a value of ACTIVE at any point in time, and thus the certificate management component 160 could scan the certificate store in either direction (i.e., forward starting from the beginning or reverse starting from the end) to identify the currently active certificate. Alternatively, the certificate management component 160 could maintain a separate index value that maps to the memory location and/or certificate ID of the currently active certificate on the device. More generally, any suitable technique for identifying the currently active certificate on the device can be used, consistent with the functionality described herein.

During a boot-up operation on the device using the second firmware package, the certificate management component 160 could scan the updated secured memory certificate store 250 to determine the currently active certificate to use to validate the second firmware package. For example, the certificate management component 160 could begin the scanning operation by starting at a predefined secure memory location (e.g., the final memory location n) and scanning backwards (i.e., towards the first memory location $210_1$) until a status of active is identified. In the depicted example, the certificate management component 160 determines that the certificate $260_2$ is the currently active certificate. The certificate management component 160 could then attempt to validate the second firmware package on the first device using the identified certificate $260_2$.

For example, the certificate management component 160 could generate a hash digest value of the second firmware package and could decrypt a signature included with the second firmware package using the identified certificate $260_2$. The certificate management component 160 could then compare the generated hash digest value with the decrypted signature value. In the event the validation operation for the second firmware package is successful (i.e., the compared values match), the certificate management component 160 could allow the boot operation of the device to continue. On the other hand, in the event the certificate management component 160 determines the validation operation is not successful, the certificate management component 160 could prevent the boot operation from completing and could provide a notification, informing the user that the boot operation was unsuccessful due to a signature mismatch for the second firmware package. In one embodiment, in the event the validation operation is not successful (i.e., the compared values do not match), the certificate management component 160 could continue iterating through the remaining certificates within the secured memory certificate store 250 (e.g., setting each certificate used in a failed validation attempt to a DEPRECATED certificate status and setting the subsequent certificate's status to ACTIVE, and then attempting to validate the second firmware package using the newly active certificate) until either the validation is successful or no certificates remain.

FIG. 3 is a flow chart illustrating a method for deprecating an active certificate used in a secure boot operation for a device, according to embodiments described herein. As shown, the method 300 begins at block 310, where the security management component 120 determines that a first certificate has been deprecated (e.g., responsive to a determination that the first certificate and/or the corresponding key pair have been compromised). The security management component 120 retrieves a second key pair associated with a second certificate (block 315) and the security management component 120 signs a first instance of device firmware received from the firmware management component 122 using a private key of the second key pair (block 320). The security management component 120 then transmits the signed device firmware 325 and any associated signature values (e.g., one or more hash digest values produced during the signing process) to the device 150 (block 325).

Upon receiving the signed device firmware, the certificate management component 160 marks the first certificate stored within a first secure memory location as deprecated (block 330). For example, the certificate management component 160 could write a value used to represent a DEPRECATED status to the certificate status field 280 corresponding to the first secure memory location. Additionally, the certificate management component 160 determines that the second certificate stored within a second secure memory location has not been marked as deprecated (block 335). For example, the second secure memory location could have a corresponding certificate status field 280 having a value representing an INACTIVE status. The certificate management component 160 could then mark the second certificate stored within the second secure memory location as active (block 340). For example, the certificate management component 160 could write the value representing an ACTIVE status to the certificate status field 280 corresponding to the second secure memory location.

Once the secure memory has been updated, the certificate management component 160 reboots the device and verifies that the secure boot operation is able to successfully validate the firmware using a signature based on the second certificate (block 345), and the method 300 ends. Advantageously, the method 300 allows a certificate to be deprecated on the device and for a new certificate to be used to validate device firmware, without the need to communicate with a remote certificate authority.

In some embodiments, the certificate management component 160 could be configured to use a certificate deprecation list 163 that contains information on certificate(s) that have been deprecated on the device 150. For example, the certificate deprecation list 163 could be an Extensible Markup Language (XML) file specifying certificate IDs of one or more deprecated certificates as well as metadata describing the deprecated certificates. An example of such an XML file is shown in FIG. 4A, which illustrates an exemplary certificate deprecation list according to one embodiment described herein. As shown, the certificate deprecation list 400 includes a deprecation XML element 410, which in turn contains a version XML sub-element 420, a family sub-element 430, and a deprecate XML sub-element 440.

Generally, the certificate deprecation list 400 could include a separate deprecation XML element 410 for each certificate that has been deprecated on the device 150. The version XML sub-element 410 generally includes metadata describing a version of the respective deprecated certificate. The family sub-element 430 generally includes metadata describing a family of product that the respective deprecated certificate corresponds to. And finally in the depicted example, the deprecate XML sub-element contains a binary value indicating whether the respective certificate should be marked as deprecated. Thus, in such an embodiment, not all certificates appearing within the certificate deprecation list 163 are necessarily deprecated on the device 150, but rather only those certificates having a deprecate value indicating the certificate has been deprecated are considered to be deprecated. Of course, such an example is provided for illustrative purposes only and without limitation, and more generally, it is generally contemplated that any number of implementations could be used to identify depreciated certificates, including (but not limited to) other XML schemas, non-XML files, and other data structures (in memory and/or on device storage).

FIG. 4A illustrates an example of a deprecated certificate according to the XML structure illustrated in FIG. 4A, according to one embodiment described herein. As shown, the certificate deprecation list 450 includes a deprecation XML element 460, containing a version XML sub-element 470 having a value of 1.0, a family XML sub-element 480 having a value of PM55xx, and a deprecate XML sub-element having a value of 1 (i.e., true). Thus, in the depicted example, the certificate having a version of 1.0 and corresponding to the product family PM55XX has been deprecated on the device 150.

Figure 5:
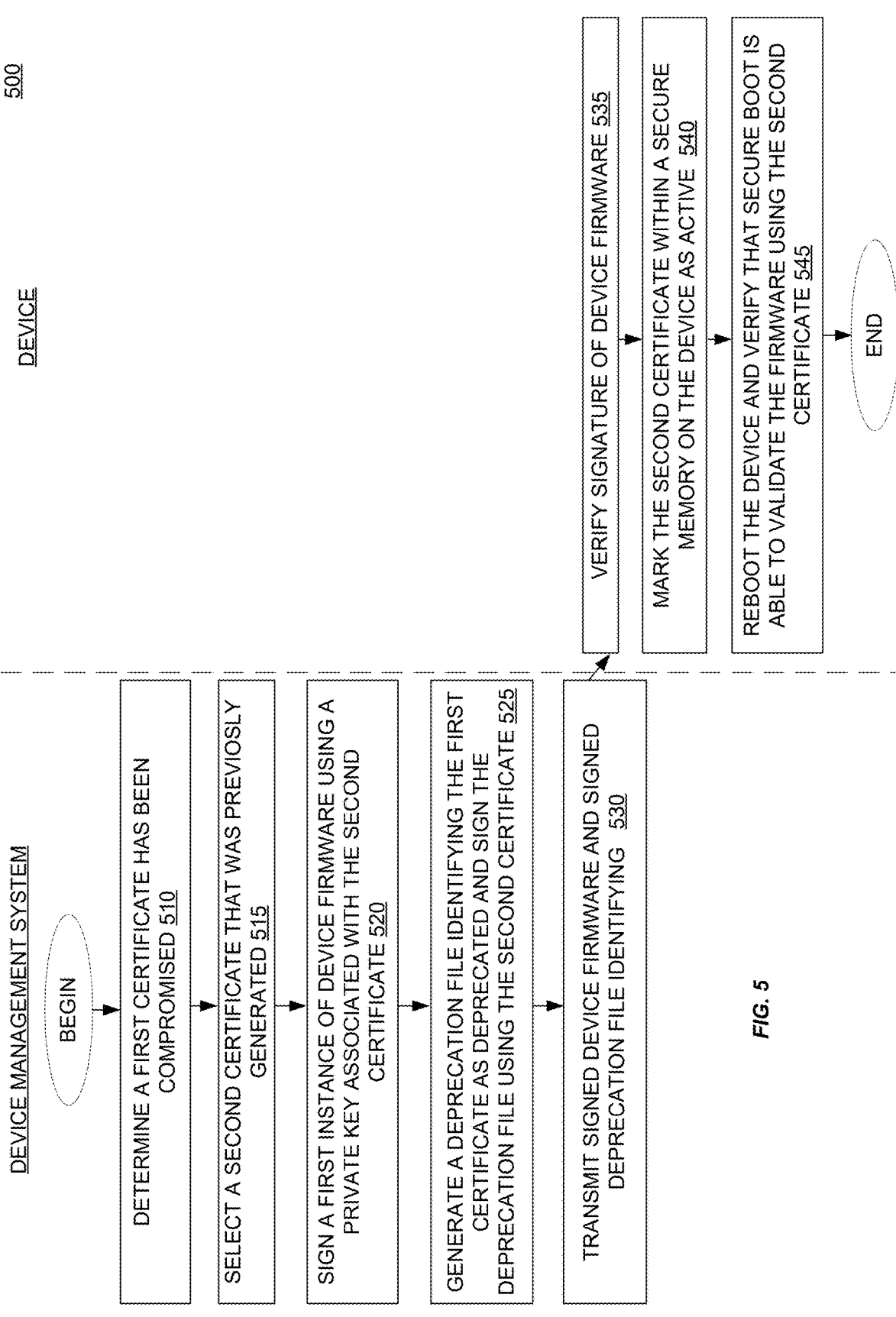
FIG. 5 is a flow chart illustrating an alternate method for deprecating a compromised certificate used in a secure boot operation for a device, according to one embodiment described herein.

FIG. 5 is a flow chart illustrating an alternate method for deprecating a certificate used in a secure boot operation for a device, according to one embodiment described herein. As shown, the method 500 begins at block 510, where the security management component 120 on the device management system 110 determines that a first certificate has been compromised (or otherwise is to be deprecated). The security management component 120 selects a second certificate from a plurality of previously generated certificates (block 515). For example, such a plurality of pre-generated certificates could have been generated by a manufacturer of a device and could be stored in a secure memory on the device at the time of manufacture (e.g., while the manufacturer was in control of the device, during an initial setup of the device, etc.).

The security management component 120 signs a first instance of device firmware using a private key associated with the second certificate (block 520) and transmits the signed device firmware to the device 110 (block 525). In one embodiment, the security management component 120 may produce one or more hash digests when signing the firmware using the corresponding private key, and the security management component 120 may include such a hash digest(s) together with the firmware when transmitting to the device 110.

Upon receiving the signed new version of firmware, the certificate management component 160 on the device 110 verifies the signature of the device firmware (block 535). For example, the certificate management component 160 could ensure that the second certificate used to generate the signature for the device firmware is associated with a certificate authority within the certificate trust store 164 on the device 150. Upon successfully verifying the signature, the certificate management component 160 may then may install the firmware. During installation of the firmware, the certificate management component 160 could mark the second certificate within a secure memory on the device as active (block 540). In doing so, the certificate management component 160 could mark one or more other certificates as deprecated (e.g., using a status field within memory, in a deprecation file such as shown in FIGS. 4A-B, etc.).

The certificate management component 160 then reboots the device 110 and verifies that a secure boot operation can successfully validate the new firmware using the newly active second certificate (block 545), and the method 500 ends. If the certificate management component 160 is unable to verify the firmware using the second certificate, the certificate management component 160 could perform an alternate action rather than allowing the device to continue booting using the newly installed firmware. For example, the certificate management component 160 could attempt to validate the firmware using one or more additional certificates stored within the memory of the device, and if the firmware can be successfully validated using another certificate, the certificate management component 160 could mark the other certificate as active and continue booting the device. Alternatively (or after attempting to validate the firmware using the other certificate(s)), the certificate management component 160 could generate an error message and could prevent the continued boot-up of the device until the validation issue can be addressed by a user.

FIG. 6 is a flow chart illustrating a method for validating firmware using an updated certificate, according to one embodiment described herein. As shown, the method 600 begins at block 610, where, when a first firmware package is installed on a first device, the certificate management component 160 associates a first certificate in a first secure memory location with an active status. The active status generally indicates that the first certificate will be used to validate new firmware downloaded to the device and/or will be used during boot operations to validate a signature of the first firmware package on the first device. Responsive to installation of a second firmware package on the first device, the certificate management component 160 associates a second certificate in a second secure memory location on the first device with an active status (block 615). In one embodiment, the second secure memory location is immediately adjacent to the first secure memory location (e.g., index k+1, where k refers to the position of the previously active certificate). In one embodiment, the certificate management component 160 can further add the previously active certificate to the certificate deprecation list 163, thereby deprecating the previously active certificate such that the certificate management component 160 will no longer use the previously active certificate when attempting to validate device firmware for the device 150.

During a boot-up operation on the first device, the certificate management component 160 determines to use the second certificate to validate the second firmware package. For example, the certificate management component 160 could start at a predefined secure memory location and scan backwards through the memory locations until a certificate having a status of active is identified (block 620). The certificate management component 160 then validates the second firmware package on the first device using the second certificate (block 625), and the method 600 ends.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A system, comprising:
one or more computer processors;
a secure memory; and
a memory comprising computer program code that, when executed by the one or more computer processors, performs a method comprising:
associating a first certificate stored in a first secure memory location in the secure memory with an active status, the first secure memory location comprising one or more first memory addresses of the secure memory, the active status indicates that the first certificate is to be used for at least one of (i) to validate an integrity of a first firmware package when the first firmware package is first downloaded for installation on the system or (ii) during boot operations to validate a first signature of the first firmware package on the system, and wherein the first certificate is digitally signed with the first signature;
responsive to installation of a second firmware package on the system, associating a second certificate stored in a second secure memory location in the secure memory with the active status, the second secure memory location comprising one or more second memory addresses of the secure memory that sequentially follow the one or more first memory addresses of the first secure memory location, the second certificate is digitally signed with a second signature, the first secure memory location and the second secure memory location respectively comprise a certificate data field, a certificate identifier field, and a certificate status field, and wherein associating the second certificate stored in the second secure memory location on the system with the active status further comprises writing a data value corresponding to an active status to the certificate status field of the second secure memory location;
determining to use the second certificate to validate the second signature of the second firmware package by scanning backwards in the secure memory starting from a predefined memory address until the active status corresponding to the second certificate is identified, the predefined memory address being one of the one or more second memory addresses or a third memory address subsequent to the one or more second memory addresses; and
responsive to validation of the second signature of the second firmware package on the system using the second certificate, performing at least one of (i) accepting and installing the second firmware package on the system or (ii) fully booting the system using the second firmware package.

2. The system of claim 1, wherein the system further comprises a trust store that stores a plurality of signer certificates, each of the plurality of signer certificates comprises a respective public key, wherein the respective public key of the plurality of signer certificates are each associated with a respective certificate authority.

3. The system of claim 2, wherein the first firmware package was signed using a first private key by a first certificate authority, and wherein the first firmware package is configured to not fully boot up until the first signature of the first firmware package is verified on the system using the first certificate.

4. The system of claim 3, wherein the second firmware package is signed using a second private key corresponding to the second certificate.

5. The system of claim 1, wherein the method further comprises:
further responsive to installation of the second firmware package on the system, associating the first certificate stored in the first secure memory location on the system with a deprecated status.

6. The system of claim 1, wherein the method further comprises:
if the validation of the second signature of the second firmware package on the system is unsuccessful, performing at least one of (i) halting installation of the second firmware package on the system or (ii) halting the boot operations of the system and generating a notification.

7. A method, comprising:
when a first firmware package is installed on a first device, associating a first certificate stored in a first secure memory location in a secure memory on the first device with an active status, the first secure memory location comprising one or more first memory addresses of the secure memory;
responsive to validation and installation of a second firmware package on the first device, associating a second certificate stored in a second secure memory location in the secure memory on the first device with an active status, the second secure memory location comprising one or more second memory addresses of the secure memory that sequentially follow the one or more first memory addresses of the first secure memory location, the first secure memory location and the second secure memory location respectively comprise a certificate data field, a certificate identifier field, and a certificate status field, and wherein associating the second certificate stored in the second secure memory location on the first device with the active status further comprises writing a data value corresponding to an active status to the certificate status field of the second secure memory location;
during at least one of (i) validation of firmware authenticity and integrity of the second firmware package for installation on the first device or (ii) a boot operation on the first device, determining to use the second certificate to validate a signature of the second firmware package by scanning backwards in the secure memory starting from a predefined memory address until the active status is identified, the predefined memory address being one of the one or more second memory addresses or a third memory address subsequent to the one or more second memory addresses; and
validating the signature of the second firmware package on the first device using the second certificate.

8. The method of claim 7, wherein the first device is configured with a trust store that stores a plurality of public keys, wherein each public key of the plurality of public keys is associated with a respective certificate authority.

9. The method of claim 8, wherein the signature is a second signature, the first firmware package was signed using a first private key by a first certificate authority, and wherein the first firmware package is not accepted and installed and is configured to not fully boot up until a signature of the first firmware package is verified on the first device using the first certificate.

10. The method of claim 9, wherein the second firmware package is signed using a second private key corresponding to the second certificate.

11. The method of claim 7, further comprising:
further responsive to the validation and the installation of the second firmware package on the first device, associating the first certificate stored in the first secure memory location on the first device with a deprecated status.

12. The method of claim 7, further comprising:
if the validation of the signature of the second firmware package on the first device is unsuccessful, halting the installation of the second firmware package or the boot operation of the first device and generating a notification.

13. The method of claim 7, wherein the one or more second memory addresses of the second secure memory location are immediately adjacent to the one or more first memory addresses of the first secure memory location.

14. A non-transitory computer-readable medium containing computer program code that, when executed by operation of one or more computer processors, performs a method comprising:

when a first firmware package is validated and installed on a first device, associating a first certificate stored in a first secure memory location in a secure memory on the first device with an active status, the first secure memory location comprising one or more first memory addresses of the secure memory;

responsive to installation of a second firmware package on the first device and after determining that the first certificate has been deprecated, associating a second certificate stored in a second secure memory location in the secure memory on the first device with an active status, the second secure memory location comprising one or more second memory addresses of the secure memory that sequentially follow the one or more first memory addresses of the first secure memory location, wherein a deprecation file provided with the second firmware package contains a first entry that indicates that the first certificate has been deprecated, wherein the first entry comprises at least a certificate identifier corresponding to the first certificate in the first secure memory location, wherein the first secure memory location and the second secure memory location respectively comprise a certificate data field, a certificate identifier field, and a certificate status field, and wherein associating the second certificate stored in the second secure memory location in the secure memory on the first device with the active status further comprises writing a data value corresponding to an active status to the certificate status field of the second secure memory location;

during at least one of (i) validation of an authentication and integrity of the second firmware package prior to the installation of the second firmware package on the first device or (ii) a boot-up operation on the first device, determining to use the second certificate to validate the second firmware package by scanning backwards in the secure memory starting from a predefined memory address until the active status is identified, the predefined memory address being one of the one or more second memory addresses or a third memory address subsequent to the one or more second memory addresses; and upon unsuccessfully validating the second firmware package on the first device using the second certificate, halting the installation of the second firmware package and/or the boot-up operation of the first device and generating a notification.

15. The non-transitory computer-readable medium of claim 14, wherein the first device is configured with a trust store that stores a plurality of public keys, wherein each public key of the plurality of public keys is associated with a respective certificate authority, wherein the first firmware package was signed using a first private key by a first certificate authority, wherein the first firmware package will not be installed and/or is configured to not fully boot up until a signature of the first firmware package is verified on the first device using the first certificate, and wherein the second firmware package is signed using a second private key corresponding to the second certificate.

16. The non-transitory computer-readable medium of claim 15, the method further comprising:

further responsive to installation of the second firmware package on the first device, associating the first certificate stored in the first secure memory location on the first device with a deprecated status.

17. The non-transitory computer-readable medium of claim 14, wherein the second secure memory location sequentially follows the first secure memory location.

18. The non-transitory computer-readable medium of claim 14, wherein the deprecation file comprises an Extensible Markup Language (XML) file, wherein the first entry further specifies a device type field and a version field, wherein the deprecation file is digitally signed using a private key associated with the second certificate, and wherein the method further comprises:

verifying a signature of the deprecation file using the second certificate.

\* \* \* \* \*